United States Patent

Dung et al.

[11] Patent Number: 5,297,159
[45] Date of Patent: Mar. 22, 1994

[54] DIRECT CURRENT-LIGHT ARC FURNACE

[75] Inventors: Herbert Dung, Dortmund; Emil Elsner, Sinzheim-Vormberg, both of Fed. Rep. of Germany

[73] Assignee: Flohe GmbH & Co., Castrop-Rauxel, Fed. Rep. of Germany

[21] Appl. No.: 838,743

[22] PCT Filed: Jul. 17, 1991

[86] PCT No.: PCT/DE91/00582
§ 371 Date: Mar. 16, 1992
§ 102(e) Date: Mar. 16, 1992

[87] PCT Pub. No.: WO92/02112
PCT Pub. Date: Feb. 6, 1992

[30] Foreign Application Priority Data

Jul. 17, 1990 [DE] Fed. Rep. of Germany ....... 4022720

[51] Int. Cl.$^5$ .............................................. H05B 7/00
[52] U.S. Cl. .................................. 373/72; 373/71; 373/75; 373/108
[58] Field of Search ................ 373/71, 72, 75, 76, 373/108

[56] References Cited

U.S. PATENT DOCUMENTS

| | | | |
|---|---|---|---|
| 3,952,140 | 4/1976 | Wunsche | 373/72 |
| 4,228,314 | 10/1980 | Stenkvist | 373/72 |
| 4,277,638 | 7/1981 | Stenkvist | 373/72 |
| 4,324,943 | 4/1982 | Stenkvist et al. | 373/72 |
| 4,468,782 | 8/1984 | Stenkvist | 373/84 |
| 4,541,099 | 9/1985 | Rappinger et al. | 373/72 |
| 4,577,326 | 3/1986 | Bergman et al. | 373/103 |
| 4,592,066 | 5/1986 | Repetto | 373/72 |
| 4,618,963 | 10/1986 | Rappinger et al. | 373/72 |
| 4,700,355 | 10/1987 | Guido | 373/72 |
| 5,052,018 | 9/1991 | Meredith | 373/72 |
| 5,173,920 | 12/1992 | Bochsler et al. | 373/72 |

FOREIGN PATENT DOCUMENTS

| | | |
|---|---|---|
| 2905553 | 9/1979 | Fed. Rep. of Germany . |
| 3413745 | 10/1984 | Fed. Rep. of Germany . |
| 3409255 | 12/1985 | Fed. Rep. of Germany . |
| 3534750 | 4/1987 | Fed. Rep. of Germany . |
| 3535692 | 4/1987 | Fed. Rep. of Germany . |

Primary Examiner—Bruce A. Reynolds
Assistant Examiner—Tu Hoang
Attorney, Agent, or Firm—Michael J. Striker

[57] ABSTRACT

A direct current arc furnace, includes a graphite cathode; and a container forming a hearth with a hearth base surface and having a container bottom acting as anode. The container bottom includes a supporting copper-plated sheet steel base consisting of a steel sheet and a copper plating plated on the steel sheet; electrical connection means extending through the steel sheet to contact the copper plating to supply an anode current to the copper plating; and a refractory brick lining having a graphite content above the copper-plated sheet steel base with the copper-plated layer adjacent the brick lining. In a preferred embodiment the graphite content in the brick lining decreases from the vicinity of the copper-plated sheet steel base to the vicinity of the hearth base surface.

8 Claims, 1 Drawing Sheet

DIRECT CURRENT-LIGHT ARC FURNACE

BACKGROUND OF THE INVENTION

The present invention is directed to a direct current arc furnace. More particularly, it relates to a direct current arc furnace which has a cathodically connected graphite electrode adjustable relative to a hearth and a container with a base forming an anode.

In direct current arc furnaces, in contrast to three-phase arc furnaces, it is possible to work with only one graphite electrode as cathode and one ground electrode as anode, which graphite electrode can be adjusted through the cover of the furnace. This results in lower construction costs with respect to the plant. Such direct current arc furnaces are also distinguished by substantially lower electrode consumption as well as by a longer service life of the refractory lining of the container wall. With respect to energy the consumption is lower; moreover network reactions (flickering) are noticeably reduced. Due to decreased inductive influences the use of austenitic steel qualities can also be dispensed with to a great extent in the construction of the furnace. Another advantage of the direct current arc furnace consists in its lower noise emissions.

Certain problems are posed in the direct current arc furnace by the anodically connected bottom electrode forming the backplate electrode for the cathodically connected graphite electrode which can be adjusted relative to the hearth through the cover of the container. An iron core penetrating through the base and through the refractory lining arranged on the base was first provided for this purpose. However, the iron core is subjected to a rapid melting away especially in melts with low carbon and high oxygen contents. Further, instead of an iron core with a comparatively large cross section, a plurality of steel rods were provided extending from an anodically connected steel plate arranged at the base of the container up to the hearth base (DE-OS 34 09 255). In this respect the lining, i.e. the insertion or application of the refractory lining, poses familiar difficulties. Difficulties are also posed by subsequently driving the steel rods into the refractory lining until contacting the anodically connected base plate. Insofar as it has been suggested to construct the area of the container base forming the anode so as to be exchangeable (DE-OS 35 35 692) corresponding problems arose in the construction of the exchange element. Moreover, in both cases the construction of the anode area remained limited to the center of the hearth base.

Instead of the steel rods forming the anode it was also suggested to form the refractory base lining itself so as to be electrically conducting by inserting stones encased in sheet metal or graphite or stones with a higher proportion of graphite. A copper insert in the form of rails or plates was provided as intermediate layer between the steel container base and the refractory lining, the anode current being applied to this copper insert (DE-OS 35 34 750 and DE-OS 34 13 745). A variant provides for a multiple-layer refractory lining of the container base having a plurality of layers of refractory electrically conducting stones and a refractory stamping mass arranged on the latter. Steel rods contacting the uppermost stone layer are driven through the stamping mass (DE-OS 29 05 553). The refractory base lining can also be provided with an anodically connected copper plate as underpinning. However, a copper plate itself is not suitable for taking over supporting functions. For this reason a sheet steel base is provided according to the prior art which is provided with a cover of abutting copper sheet segments which are connected with the sheet steel base by a plurality of pins.

The construction of the container base itself as anode proves advantageous to the extent that the current conduction is effected with the greatest possible contact surface resulting in a low specific current loading of the container base, specifically its refractory lining, which is reflected in an improvement of the service life of the base. The manner in which the supporting sheet steel base is connected with the copper covering proves disadvantageous in this prior art. For this purpose a plurality of bore holes are to be introduced into the sheet steel base and into the copper sheet segments assigned to it with a matching hole pattern. The pins connecting the elements extend through these copper sheet segments. This manner of connecting the sheet steel base and copper sheet segments is obviously very costly. Air gaps also necessarily remain between the sheet steel base and the copper covering and between the copper sheet segments themselves as well as between the supporting sheet steel base and the copper segments which also undergo an enlargement in the course of operation under the influence of the high operating temperature. This results in the risk that heavy metal proceeding from the insert will run under the copper covering. The required cooling of the base is accordingly impaired and ultimately also the life of the base.

SUMMARY OF THE INVENTION

Accordingly, it is an object of the present invention to provide a direct current-light arc furnace with a copper covering, which avoids the disadvantages of the prior art.

In keeping with this object and with others which will become more apparent hereinafter, one feature of the present invention resides, briefly stated, in a direct current-light arc furnace which, in accordance with the present invention, includes a graphite cathode; and a container forming a hearth with a hearth base surface and having a container bottom acting as anode. The container bottom includes a supporting copper-plated sheet steel base consisting of a steel sheet and a copper plating plated on the steel sheet; electrical connection means extending through the steel sheet to contact the copper plating to supply an anode current to the copper plating; and a refractory brick lining having a graphite content above the copper-plated sheet steel base with the copper plated layer adjacent the brick lining.

The container bottom having copper-plated sheet steel base according to the invention is a simple compact structural component part which is accordingly inexpensive. The structural component part combines a desired greatest possible contact surface for the current conduction with an avoidance of the defects which encumber the sheet steel bases which are provided, according to the prior art, with a copper covering in the form of rails, plates or sheet metal blanks (segments).

The large contact surface for the current conduction makes it possible to provide in the lining proceeding from the base a decreasing proportion of structural component parts, particularly graphite, which bring about the electrical conductivity of the refractory lining. The service life of the refractory lining is accordingly increased. With a corresponding objective, a refractory lining which is substantially free of the structural component parts bringing about the electrical conductivity can be provided in the center of the base lining. In a preferred embodiment an layer of graphite inserted between the copper-plated sheet steel base and the refractory lining arranged on the latter improves the current conduction from the base into the lining under which the base serves as a support. Of course, a copper alloy plating with a high proportion of copper can also be provided for the supporting structural component part of the container base instead of copper plating.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
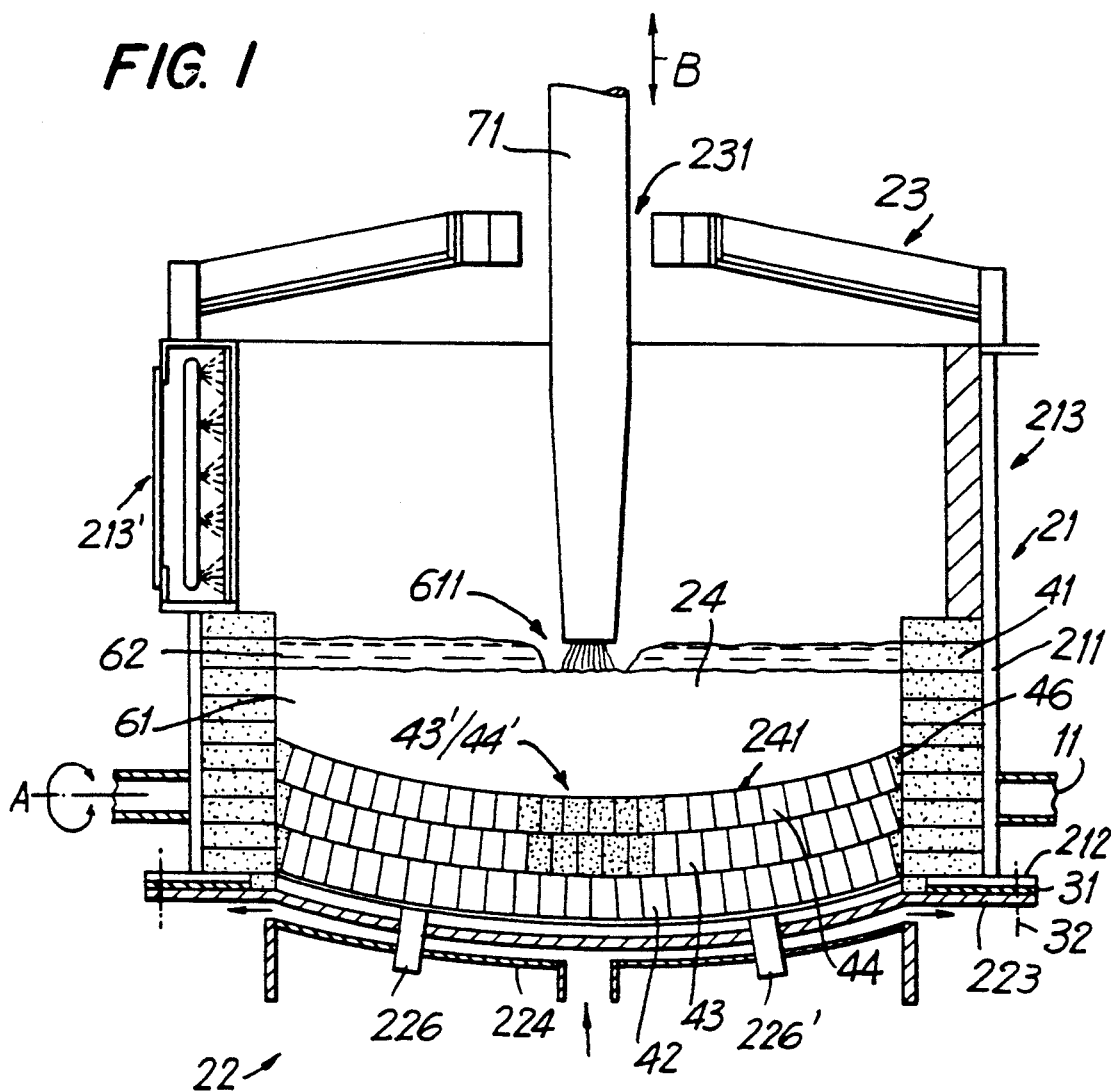
FIG. 1 shows the arc furnace in section.
Figure 2:
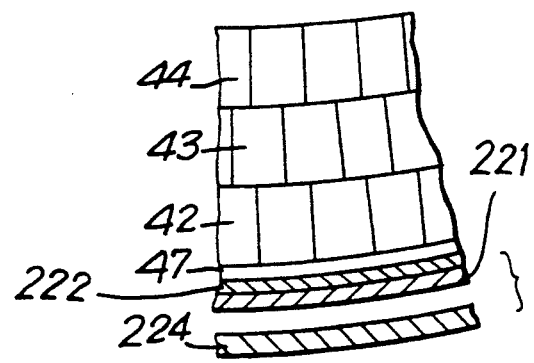
FIG. 2 shows a section from the container base in enlarged

The furnace includes the container 21 with a container bottom 22 and the cover 23 which can be lifted from it. The container 21 is supported in a supporting construction 11 integrated in the furnace platform so as to be tiltable (double arrow A). The container bottom 22 having copper-plated sheet steel base 221, 222 is detachably flanged on (212, 32, 223) at the container casing 211 with the inclusion of insulation 31.

The container 21, is provided with a hearth 24 with the hearth base surface 241, which is lined, i.e. provided with a refractory brick lining. Concretely, the wall is lined in the vicinity of the hearth 24 with magnesite stones 41 and the copper-plated sheet steel base with a plurality of layers 42, 43 and 44 of magnesite stones containing graphite, the first layer 42 of which has the highest proportion of graphite, approximately 20%. The next layer 43 contains approximately 10% and the third layer 44 contains less than 10% graphite with a central region 43', 44' in which graphite-free magnesite stones are inserted at least in the upper stone layers. Intermediate spaces remaining between the brick lining 41 of the wall and the brick lining 42, 43, 44 of the base are filled up with refractory stamping mass 46. A graphite layer 47 is inserted between the container copper-plated sheet steel base 221,222 and the lowest layer 42 of the brick lining. Refractory, graphite containing stamping mass can then be applied to the uppermost stone layer 44; at least the uppermost layer 44 itself can also have refractory stamping mass. The container wall above the hearth 24 is formed by cooling elements, e.g. elements 213 through which cooling water flows, or by spray cooling elements 213'. An air conducting plate 224 is provided below the base 221,222 for cooling the base.

The melt 61 with the slag 62 located on it is situated in the hearth 24. The combustion point 611 is formed in the center.

A graphite cathode 71 is guided in a central passage 231 in the container cover 23 in such a way that it can be raised and lowered (double arrow B). The anode current is applied to the copper plating 222 of the container base 22 via the electrical connections 226, 226' extending through the sheet steel base 221.

In the shown furnace the electrically conducting magnesite stones are cut out and the electrically non-conductive magnesite stones 43', 44' are inserted in the center of the base lining 42, 43, 44 in the upper layers 43, 44.

It will be understood that each of the elements described above, or two or more together, may also find a useful application in other types of constructions differing from the types described above.

While the invention has been illustrated and described as embodied in a direct current-light arc furnace, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A direct current arc furnace, comprising a graphite cathode; and
   a container forming a hearth with a hearth base surface and having a container bottom, wherein said container bottom includes a supporting copper-plated sheet steel base consisting of a steel sheet and a copper plating on said steel sheet; electrical connection means extending through said steel sheet to contact said copper plating to supply an anode current to said copper plating; and a brick lining of refractory material arranged on said copper-plated sheet steel base, said copper plating being positioned between said brick lining and said steel sheet.

2. A direct current arc furnace as defined in claim 1, wherein said brick lining is composed of graphite-containing material having a graphite content.

3. A direct current arc furnace as defined in claim 2, wherein said graphite content in said brick lining decreases from the vicinity of said copper-plated sheet steel base to the vicinity of said hearth base surface.

4. A direct current arc furnace as defined in claim 3, wherein a graphite proportion in said brick lining in the vicinity of said copper-plated sheet steel base is 20%, while a graphite proportion in said brick lining in the vicinity of said hearth base surface is below 10%.

5. A direct current arc furnace as defined in claim 1, further comprising a graphite layer located between said copper-plated sheet steel base and said brick lining.

6. A direct current arc furnace as defined in claim 1, wherein said brick lining has a central region substantially free of graphite.

7. A direct current arc furnace as defined in claim 1, wherein said copper plating has a maximum thickness of 10 mm.

8. A direct current arc furnace as defined in claim 1, wherein said container has a cover, said graphite cathode being adjustably positionable relative to the hearth base surface through said cover of said container.

* * * * *